US006301447B1

(12) United States Patent
Jackson et al.

(10) Patent No.: US 6,301,447 B1
(45) Date of Patent: Oct. 9, 2001

(54) METHOD AND SYSTEM FOR CREATION AND INTERACTIVE VIEWING OF TOTALLY IMMERSIVE STEREOSCOPIC IMAGES

(75) Inventors: Laban P. Jackson, Knoxville; Bruce Cole, North Oak Ridge; H. Lee Martin, Knoxville, all of TN (US)

(73) Assignee: Interactive Pictures Corporation, Oak Ridge, TN (US)

( * ) Notice: Subject to any disclaimer, the term of this patent is extended or adjusted under 35 U.S.C. 154(b) by 0 days.

(21) Appl. No.: 09/168,174

(22) Filed: Oct. 8, 1998

Related U.S. Application Data (63) Continuation-in-part of application No. 08/767,376, filed on Dec. 16, 1996, now abandoned, which is a continuation-in-part of application No. 08/516,629, filed on Aug. 18, 1995, now Pat. No. 5,990,941, which is a continuation-in-part of application No. 08/494,599, filed on Jun. 23, 1995, now abandoned, which is a continuation-in-part of application No. 08/386,912, filed on Feb. 8, 1995, now abandoned, which is a continuation of application No. 08/339,663, filed on Nov. 14, 1994, now abandoned, which is a continuation of application No. 08/189,585, filed on Jan. 31, 1994, now Pat. No. 5,384,588, which is a continuation-in-part of application No. 08/014,508, filed on Feb. 8, 1993, now Pat. No. 5,359,363, which is a continuation-in-part of application No. 07/699,366, filed on May 13, 1991, now Pat. No. 5,185,667, said application No. 08/494,599, is a continuation-in-part of application No. 08/373,446, filed on Jan. 17, 1995, said application No. 08/516,629, is a continuation-in-part of application No. 08/373,466, which is a continuation-in-part of application No. 08/189,585, which is a continuation-in-part of application No. 08/863,584, filed on May 27, 1997, which is a continuation-in-part of application No. 08/386,912, filed on Feb. 8, 1995, said application No. 08/863,584, is a continuation-in-part of application No. 08/373,446, said application No. 08/189,585.

(51) Int. Cl.[7] .................................................. G03B 35/00
(52) U.S. Cl. ............................ 396/329; 396/428; 348/50; 352/57
(58) Field of Search ................................. 396/20, 24, 324, 396/329, 419, 428; 348/42, 51, 52, 50; 352/57, 58

(56) References Cited

U.S. PATENT DOCUMENTS 812,163 * 2/1906 Bried ...................................... 396/23

(List continued on next page.)

OTHER PUBLICATIONS

DC200 The Kodak Kit, date unknown.
(List continued on next page.)

*Primary Examiner*—David M. Gray
(74) *Attorney, Agent, or Firm*—Banner & Witcoff, Ltd.

(57) ABSTRACT

A method and system for the creation and viewing of stereoscopic immersive images. By creating two immersive images from an offset camera platform, the illusion of depth can be provided by a left and right view in the form of an interactive panoramic image. By capturing two immersive images on a fixture with horizontal separation of the centers of each immersive image, each constructed from a sequence of fisheye images that are captured in a constant direction and seamed together, two files that can be used to produce a stereoscopic display are created. The resulting files can be displayed using any number of stereoscopic displays including dual monitors, one for each eye, or shuttered displays for each eye from a single monitor, or displays with polarized filters directing separate views to each eye.

A method of capturing immersive images for stereoscopic display comprising the steps of mounting a camera input means on an offset camera platform means; rotating the offset camera means through a series of positions in a constant direction; capturing an immersive image with the camera input means at each of the series of positions; converting the captured immersive images into digital data images; creating two totally immersive representations from the digital data images, one for each eye, and digitally storing the totally immersive representations in memory; transforming a portion of the totally immersive representation with distortion and perspective correction; and displaying the two totally immersive representations independently to each eye of a user.

18 Claims, 7 Drawing Sheets

U.S. PATENT DOCUMENTS

| | | | | |
|---|---|---|---|---|
| 1,282,177 | * | 10/1918 | Blankenhorn | 396/20 |
| 2,356,383 | * | 8/1944 | Clarke | 396/544 |
| 2,671,392 | * | 3/1954 | Robins | 396/329 |
| 4,214,821 | | 7/1980 | Termes . | |
| 4,949,108 | | 8/1990 | Verret . | |
| 5,155,512 | * | 10/1992 | Leonard | 396/424 |
| 5,345,284 | * | 9/1994 | Tsuruta | 396/190 |
| 5,497,188 | | 3/1996 | Kaye | 348/36 |
| 5,508,734 | * | 4/1996 | Baker et al. | 348/36 |
| 5,677,729 | | 10/1997 | Kuga et al. | 348/37 |
| 5,703,604 | * | 12/1997 | McCutchen | 345/8 |
| 5,790,184 | * | 8/1998 | Sato et al. | 348/53 |
| 5,821,989 | * | 10/1998 | Lazzaro et al. | 348/56 |
| 5,896,116 | * | 4/1999 | Torizuka et al. | 345/87 |
| 5,903,782 | * | 5/1999 | Oxaal | 396/50 |

OTHER PUBLICATIONS

The OLYMPUS 340 Kit, date unknown.

The Nikon Kit Featuring the COOLPIX 900, date unknown.

* cited by examiner

METHOD AND SYSTEM FOR CREATION AND INTERACTIVE VIEWING OF TOTALLY IMMERSIVE STEREOSCOPIC IMAGES

This application makes reference to, incorporates herein and claims all benefits accruing under 35 U.S.C. § 119(e) by virtue of a provisional patent application earlier filed in the United States Patent and Trademark Office on Oct. 8, 1997, entitled METHOD AND SYSTEM FOR CREATION AND INTERACTIVE VIEWING OF TOTALLY IMMERSIVE STEREOSCOPIC IMAGES which was duly assigned Ser. No. 60/061,342. This application is a continuation-in-part of U.S. patent application Ser. No. 08/767,376 filed Dec. 16, 1996 now abandoned, which is a continuation-in-part of U.S. patent application Ser. No. 08/516,629 filed Aug. 18, 1995, now U.S. Pat. Ser. No. 5,990,941 which is a continuation-in-part of U.S. patent application Ser.No. 08/494,599 filed Jun. 23, 1995 (now abandoned), which is a continuation-in-part of U.S. patent application Ser. No. 08/386,912 filed Feb. 8, 1995 now abandoned, which is a continuation of U.S. patent application Ser. No. 08/339,663 filed Nov. 14, 1994 now abandoned, which is a continuation of U.S. patent application Ser. No. 08/189,585 filed Jan. 31, 1994 (now U.S. Pat. No. 5,384,588), which is a continuation-in-part of U.S. patent application Ser. No. 08/014,508 filed Feb. 8, 1993 (now U.S. Pat. No. 5,359,363), which is a continuation-in-part of U.S. patent application Ser.No. 07/699,366 filed May 13, 1991 (now U.S. Pat. No. 5,185,667). Furthermore, U.S. patent application Ser. No. 08/494,599 filed Jun. 23, 1995 (now abandoned), and U.S. patent application Ser. No. 08/516,629 filed Aug. 18, 1995, are both continuation-in-parts of U.S. patent application Ser. No. 08/373,446 filed Jan. 17, 1995, which is a continuation-in-part of U.S. patent application Ser.No. 08/189,585 filed Jan. 31, 1994 (now U.S. Pat. No. 5,384, 588). This application is also a continuation-in-part of U.S. patent application Ser. No. 08/863,584 filed May 27, 1997, which is a continuation-in-part of U.S. application Ser. No. 08/386,912 filed Feb. 8, 1995, which is a continuation of U.S. patent application Ser. No. 08/339,663 filed Nov. 11, 1994, which is a continuation of U.S. patent application Ser. No. 08/189,585 filed Jan. 31, 1994 (now U.S. Pat. No. 5,384,588), which is a continuation-in-part of U.S. patent application Ser. No. 08/014,508 filed Feb. 8, 1993 (now U.S. Pat. No. 5,359,363), which is a continuation-in-part of U.S. patent application Ser. No. 07/699,366 filed May 13, 1991 (now U.S. Pat. No. 5,185,667). In addition, U.S. patent application Ser. No. 08/863,584 filed May 27, 1997, is also a continuation-in-part of U.S. application Ser. No. 08/373, 446 filed Jan. 17, 1995, which is a continuation-in-part of U.S. patent application Ser. No. 08/189,585 filed Jan. 31, 1994 (now U.S. Pat. No. 5,384,588).

TECHNICAL FIELD

This invention relates to support structures for image capturing devices and the methods for their use in the capture and creation of totally immersive stereoscopic images from fisheye or wide-angle images captured from the support structures.

BACKGROUND OF THE INVENTION

One of the purposes of modern photography is to encourage a viewer to explore an image and, in the process, transform the image into something more than a two dimensional representation of space. Panoramic images provide some feeling of being enveloped into an image, but this feeling diminishes at the periphery of the image.

To create a greater feeling of being enveloped and to provide a greater resolution image to a viewer, high numbers of picture elements have been combined to create even larger panoramic images. See, for example, U.S. Pat. No. 5,083,389 to Alperin which is expressly incorporated herein by reference. Unfortunately, the combining of a plurality of images creates the potential for distortions at the seams of the images. Additionally, the number of images required to create a composite image in this manner is burdensome.

A partially enveloping image was disclosed in U.S. Pat. No. 5,185,667 to Zimmermann, expressly incorporated by reference to its entire contents. Zimmermann discloses a system and method for navigating about a spherically distorted image where the user's inputs control the displayed portion of the screen.

Another difficulty of capturing large field-of-view images is the potential for misalignment of a camera as it is moved from a first image capturing position to a second image capturing position. Further, with multiple images being captured, the possible alignment error grows with each movement of a misaligned camera. The resulting images then require additional manual correlation to compensate for any misalignment of the camera.

Yet another difficulty is providing a supporting structure which allows for the quick and easy capture of an image. Another difficulty is providing a portable support for a camera where the support does not require numerous adjustments to capture panoramic or spherical images. See, for example, U.S. patent application Ser. No. 08/767,376 filed Dec. 16, 1996 to Kuban et al. that is expressly incorporated herein by reference. While the Kuban et al. system solves the above problems, it is directed to the capture of images about a single axis of rotation, which effects the usefulness of these images when used for stereoscopic viewing. This effect is due to the identical image being used as the display in each eye, which does not account for the normal inter-pupillary distance between a user's eyes. This inter-pupillary distance is necessary for realistic stereoscopic viewing.

None of this previous work uses the new techniques described in this application for the capture and creation of stereoscopic immersive images. Therefore, there is a need for the method of and apparatus for capturing fisheye or wide-angle images and then creating and displaying totally immersive stereoscopic images from the fisheye and wide-angle images.

SUMMARY OF THE INVENTION

The problems and related problems of the prior art are overcome by the principles of the present invention. According to these principles, a lens supporting structure is disclosed which provides exact alignment of and offsets for a image capture means. The exact alignment produces captured images that are properly aligned for easily seaming together the captured images to form spherical images. In addition, the combination of the exact alignment and offsets is used to produce multiple, properly aligned captured images to form a seamed panoramic view. Embodiments of the present invention include a base support structure that rotably attaches to an offset mounting system that includes a rotable eccentric mount support and a rotable lens mount support that attaches to and supports a image capture means. Embodiments of the present invention also contemplate the offset mounting system and rotable lens mount taking on a variety of forms and combinations. For simplicity, the rotable lens mount is described herein as a ring and associated elements thereof Additional configurations of the rotable lens mount include a supporting platform and equivalents thereof In at least one embodiment, the rotable lens mount attaches to a rotating sleeve that rotates about a central bore. In one embodiment the supporting structure is a tripod; in another a monopod is used to diminish the footprint of the structure on the image.

In one embodiment, the axis of rotation of the lens mount coincides with a plane of an objective lens of the lens where the plane signifies a large field-of-view of the lens. In another embodiment, the plane signifies an approximate 180-degree field-of-view of the lens. In yet another embodiment, the plane signifies a field-of-view greater than 180 degrees. The axis of rotation of the lens mount is preferably co-linear with the axis of rotation of the lens. By rotating the image capture means about the rotable eccentric mount support and by rotating the lens about the axis of rotation of the lens mount, multiple images are captured. In particular, through the controlled positions of the eccentric and lens mounts, the captured images are seamed together to form totally immersive stereoscopic images. The number of fixed positions of the lens mount accounts for lenses with various fields-of-view.

In one embodiment, the offset mounting system consists of a lens mount, where the lens mount bottom securely attaches to the top end of the top-half of a two-stop rotator. The bottom end of the top-half of the two-stop rotator is rotably connected to the top end of the bottom-half of the two-stop rotator and the bottom end of the bottom-half of two-stop rotator securely attaches to the top side at a first end of the eccentric mount. The bottom side at a second end of the eccentric mount securely attaches to the top end of the top-half of an n-stop rotator, where n is a number greater than one. The bottom end of the top-half of the n-stop rotator is rotably connected to the top end of the bottom-half of the n-stop rotator.

By way of example only, capturing and seaming together left and right hemispherical images are described in greater detail in co-pending U.S. application Ser. No. 08/863,584 filed May 27, 1997, which is incorporated by reference herein as to its entire contents.

Additional techniques for capturing first and second images having approximately equal to or greater than 180 degree field-of-view are described in co-pending U.S. application Ser. No. 08/494,599 filed Jun. 23, 1995, which is incorporated by reference herein as to its entire contents.

Through the use of perspective correction and manipulation disclosed in U.S. Pat. No. 5,185,667 to Zimmermann and its progeny including U.S. Pat. Nos. 5,384,588; 5,359,363; and 5,313,306 and U.S. patent application Ser. Nos. 08/189,585 filed Jan. 31, 1994, Ser. No. 08/339,663 filed Nov. 11, 1994 and Ser. No. 08/373,446 filed Jan. 17, 1995, the formed seamless image is explored, of which these are expressly incorporated by reference as to their entire contents. The exact representation of the transformation provided by this approach allows the seamless edges to be produced when the data is collected in a controlled manner.

Consequently, a method of capturing immersive images for stereoscopic display is claimed comprising the steps of: mounting an offset mounting means to a support means at a first end of the offset mounting means; mounting an image capture means to a second end of the offset mounting means and rotating the offset mounting means so that the image capture means is in a first position; rotating the offset mounting means through a first series of positions in a constant direction; capturing an immersive image with the image capture means at each of the series of positions such that the immersive images cover a 360 degree field-of-view; converting each of the captured immersive images into a first digital data image for each of the series of first positions; creating a first totally immersive representation; storing the first totally immersive representation in memory; rotating the offset mounting means so that the image capture means is in a second position, wherein the second position is 180 degrees apart from the first position; rotating the offset mounting means through a second series of positions in the constant direction; capturing an immersive image with the camera input means at each of the series of positions such that the immersive images cover a 360 degree field-of-view; converting each of the captured immersive images into a second digital data image for each of the series of second positions; creating a second totally immersive representation; and storing the totally immersive representation in memory:

Consequently, a camera mounting apparatus for use in capturing totally immersive stereoscopic images is claimed that comprises: an n-stop rotator means having a top end and a bottom end; an eccentric mount means having a top side, a bottom side, a first end, and a second end, wherein the bottom side of the first end of the eccentric mount means is rigidly attached to the top end of the n-stop rotator means; a two-stop rotator means having a top end and a bottom end, wherein the bottom end of the two-stop rotator means is rigidly attached to the top side of the second end of the eccentric mount means; and a lens mount means having a bottom side, wherein the bottom side of the lens mount means is rigidly attached to the top end of the two-stop rotator means.

Consequently, a system for capturing immersive images for stereoscopic display is claimed comprising: an image capture means for capturing immersive images; an offset mounting means for mounting said image capture means thereon; a support means for mounting said offset mounting means thereon; an image receiving means for receiving said captured immersive images from said camera input means; a conversion means for converting said captured immersive images into digital data images; a storage means for storing said digital data images in memory; a processing means for creating two totally immersive representations from said digital data images, one for each eye; an associating means for associating said totally immersive representations as a pair; a transformation means for transforming a portion of said totally immersive representation with distortion and perspective correction; and a stereoscopic display means for displaying said two totally immersive representations independently to each eye of a user.

Consequently, a method of displaying totally immersive representations is claimed comprising the steps of. transforming portions of a first totally immersive representation and a second totally immersive representation with distortion and perspective correction, wherein the transforming portions step comprises the steps of: reading even lines from a first totally immersive representation digital image file, sending said even lines to a transformer for transforming said even lines into a right eye image, reading odd lines from a second totally immersive representation digital image file, and sending said odd lines to a transformer for transforming said odd lines into a left eye image; displaying said transformed portions, wherein said displaying each said transformed portion step further comprises the steps of: selecting a stereoscopic display device for receiving said portions, said stereoscopic display device being selected from, but not limited to, the group comprising: independent miniature displays head mounted for each eye, displays with polarized filters that direct independent monitor images to each eye, color filters that direct stereo images to each eye through color mapping, and sequential shuttered glasses that alternately display every image to alternating eyes allowing the left eye to receive the left eye image and then the right eye to receive the right eye image, in rapid succession; and receiving said portions from said totally immersive representations in said stereoscopic display device.

Consequently, a method of capturing immersive images for stereoscopic display is claimed comprising the steps of mounting an image capture means on an offset mounting means; rotating the offset mounting means through a series of positions in a constant direction; capturing an immersive image with the image capture means at each of the series of positions; converting the captured immersive images into digital data images; creating two totally immersive representations from the digital data images, one for each eye, and digitally storing the totally immersive representations in memory; transforming a portion of the totally immersive representation with distortion and perspective correction; and displaying the two totally immersive representations independently to each eye of a user.

DETAILED DESCRIPTION

Figure 1A:
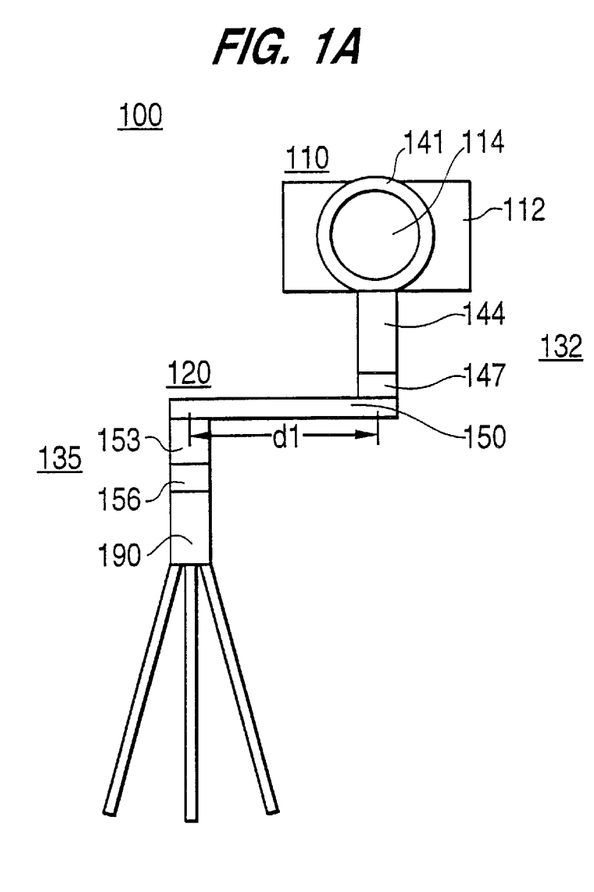
FIG. 1A illustrates a front view of one embodiment of the stereoscopic image capture system.

FIG. 1A shows a front view of the stereoscopic image capture system 100 as contemplated by embodiments of the present invention. System 100 includes an image capture means 110 securely mounted to an offset mounting means 120 and offset mounting means 120 is mounted to a support means 190. Image capture means 110 consists of a camera 112 with a lens 14 securely mounted to the camera 112. Embodiments of the present invention contemplate the camera 112 as a still camera taking chemical or digital pictures, or a video camera capturing video images.

In one embodiment, the lens 114 is a wide-angle lens. Other embodiments of the present invention contemplate the lens 114 including the lens types of: fish-eye, hemispherical, and greater than hemispherical types of lenses. Embodiments of the present invention contemplate the support means 190 including stable base structures such as tripods and tripod-monopod combinations. Offset mounting means 120 consists of a lens mount 141 that securely attaches to a top-half 144 of a two-stop rotator 132. The top-half 144 of the two-stop rotator 132 is rotably connected to a bottom-half 147 of the two-stop rotator 132. The bottom-half 147 of the two-stop rotator 132 securely attaches on the top-side of a first end of an eccentric mount 150. The bottom-side of a second end of the eccentric mount 150 securely attaches to a top-half 153 of an n-stop rotator 135, where n is a number greater than one. The top-half 153 of the n-stop rotator 135 is rotably connected to a bottom-half 156 of the n-stop rotator 135. The bottom-half 156 of n-stop rotator 135 is mounted on a support means 190. Two-stop rotator 132 and n-stop rotator 135 are separated by an inter-device distance d1, for example, simulating the average interpupillary distance of human eyes approximately 3 inches. In one embodiment, the inter-device distance d1 is half the interpupillary distance, approximately 1½ inches.

Embodiments of the present invention contemplate the two-stop and n-stop rotators 132 and 135, respectively, including a low friction layer between the contacting surfaces of the top-half 144 and bottom-half 147 of two-stop rotator 132 and between the top-half 153 and bottom-half 156 of n-stop rotator 135. This low friction layer preferably includes at least one Teflon™ (or equivalent) disk. Alternative embodiments of the two-stop and n-stop rotators 132 and 135, respectively, include bearings, a fluid filled enclosure, and coated surfaces. In one embodiment, the lens mount 141, two-stop rotator 132, eccentric mount 150, n-stop rotator 135, and support means 190 are made of aluminum and/or anodized aluminum.

By rotating the top-half 144 of two-stop rotator 132 180 degrees, the lens 114 points in a direction opposite from its initial direction. Positioning devices (see FIG. 5 description) between top-half 144 and bottom-half 147 of two-stop rotator 132 securely maintain lens 114 in a first position and in a second, opposite position, where the first and second positions differ by 180 degrees. Accordingly, a user wishing to capture two oppositely directed images photographs a first image with the camera 112 in a first position, rotates the top-half 144 of the two-stop rotator 132 until the camera 112 is oriented in a second position, which is 180 degrees apart from the first position, and photographs a second image.

Figure 1B:
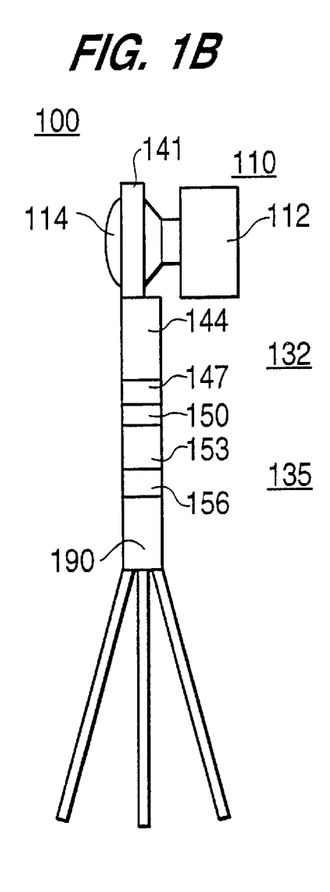
FIG. 1B illustrates a side view of one embodiment of the stereoscopic image capture system.

FIG. 1B illustrates a side view of the stereoscopic image capture system 100 illustrated in FIG. 1A.

Figure 2A:
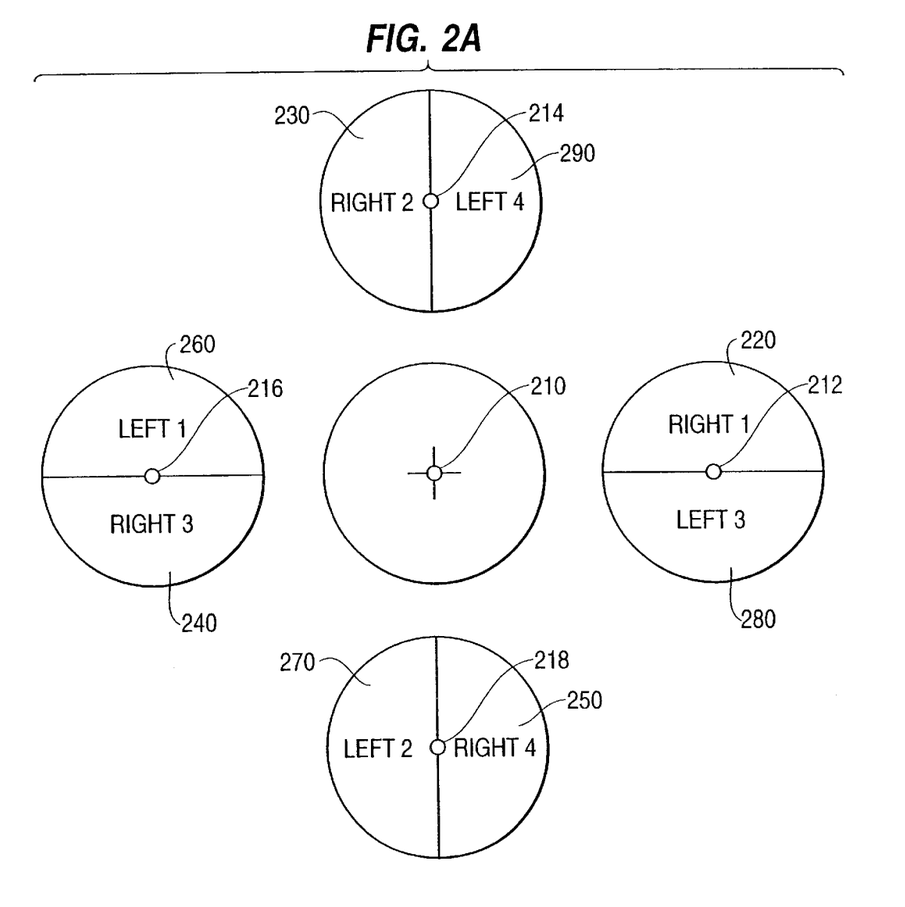
FIG. 2A illustrates a diagram of the image orientations and the order for the steps in the image capture process.

FIG. 2A shows the images captured by the stereo image capture process of the present invention. In FIG. 2, an embodiment is shown for capturing images every 90 degrees with the stereoscopic image capture system 100 being centered at point 210. In this embodiment, the center of stereoscopic image capture system 100 is the center of n-stop rotator 135 and the center of image capture means 110 is the center of two-stop rotator 132. Offset mounting means 120 is first offset to the right of center 210 so that image capture means 110 is centered over right position 212 and lens 114 is oriented toward right 1 image 220. Right 1 image 220 is captured using image capture means 110. Offset mounting means 120 is then rotated 90 degrees in a counter-clockwise direction so that image capture means 110 is centered over top position 214 with camera lens 114 oriented toward right 2 image 230. Right 2 image 230 is captured using image capture means 110. Offset mounting means 120 is again rotated 90 degrees in a counter-clockwise direction so that image capture means 110 is centered over left position 216 with lens 114 oriented toward right 3 image 240. Right 3 image 240 is captured using image capture means 110. Offset mounting means 120 is rotated a final 90 degrees in a counter-clockwise direction so that image capture means 110 is centered over bottom position 218 with lens 114 oriented toward is right 4 image 250. Right 4 image 250 is captured using image capture means 110.

Figure 2B:
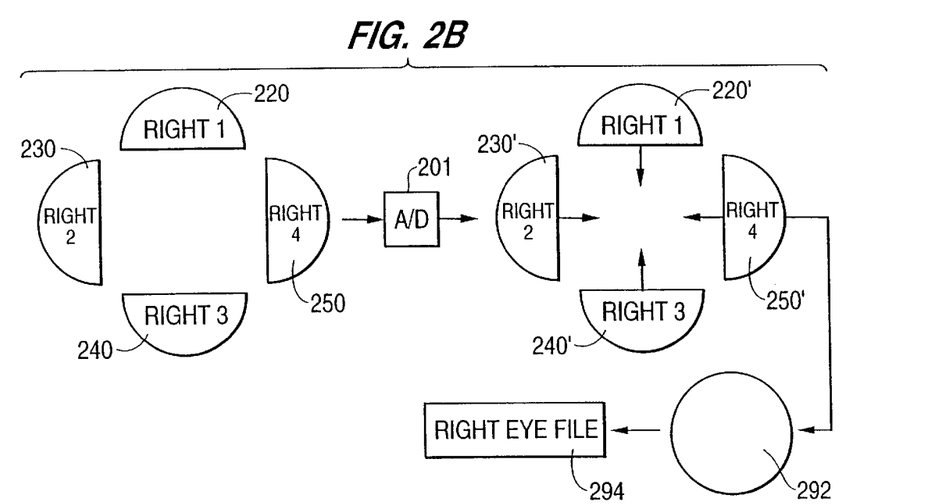
FIG. 2B illustrates the right image digitization process and right totally immersive representation creation process.

FIG. 2B shows right 1, 2, 3, and 4 images 220, 230, 240, and 250, respectively, are sent through an Analog-to-Digital (A/D) converter 201 and digitized into right 1, 2, 3, and 4 digital images 220', 230', 240', and 250', respectively. Then, all of the right digital images 220', 230', 240', and 250' are combined into a right eye totally immersive representation 292. The right eye totally immersive representation 292 is then stored in a right eye file 294 for future display. While the order of image capture and the direction of rotation of the offset mounting means 120 can be varied in alternate embodiments of the present invention, this will require additional manual operator intervention and a more complex processing system. The order and constant direction specified in this embodiment of the present invention has been selected to maximize the efficiency of the image capture and totally immersive representation creation processes. The constant s direction specified in this embodiment could have also been clockwise.

A similar set of steps are followed to capture the left eye images. Offset mounting means 120 is first offset to the left of center 210 so that image capture means 110 is centered over left position 216 and lens 114 is oriented toward left 1 image 260. Left 1 image 260 is captured using image capture means 110. Offset mounting means 120 is then rotated 90 degrees in a counter-clockwise direction so that image capture means 110 is centered over bottom position 218 with lens 114 oriented toward left 2 image 270. Left 2 image 270 is captured using image capture means 110. Offset mounting means 120 is again rotated 90 degrees in a counter-clockwise direction so that image capture means 110 is centered over right position 212 with lens 114 oriented toward left 3 image 280. Left 3 image 280 is captured using image capture means 110. Offset mounting means 120 is rotated a final 90 degrees in a counter-clockwise direction so that image capture means 110 is centered over top position 214 with lens 114 oriented toward left 4 image 290. Left 4 image 290 is captured using image capture means 110.

Figure 2C:
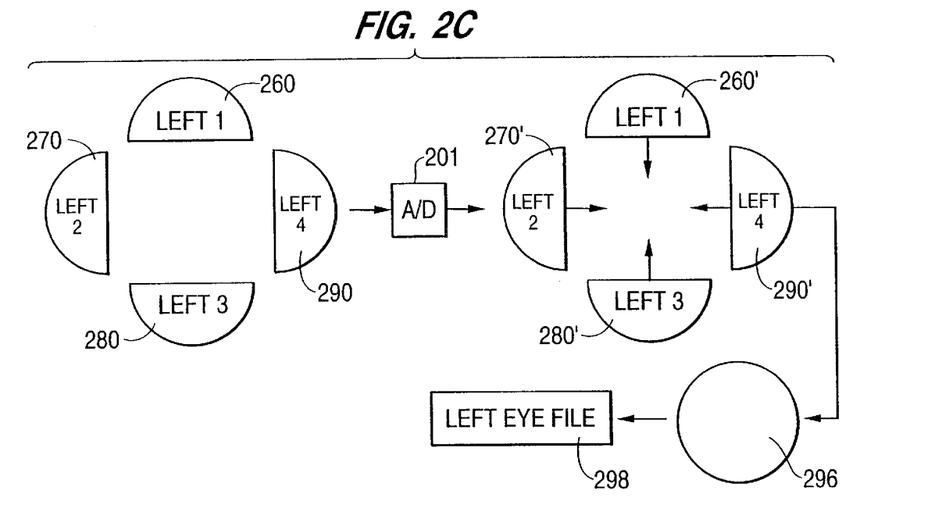
FIG. 2C illustrates the left image digitization process and left totally immersive representation creation process.

FIG. 2C shows left 1, 2, 3, and 4 images 260, 270, 280, and 290, respectively, are sent through the A/D converter 201 and digitized into left 1, 2, 3, and 4 digital images 260', 270', 280', and 290', respectively. Then, all of the left digital images 260', 270', 280', and 290' are combined into a left eye totally immersive representation 296. The left eye totally immersive representation 296 is then stored in a left eye file 298 for future display.

The creation of the right and left totally immersive representations 292 and 296, respectively, and subsequent storage in right and left eye files 294 and 298 296, respectively, create images that are internally seamless and perfectly aligned. Similarly, the points in the right eye file 294 and the left eye file 298 are also perfectly aligned so as to provide the correct perspective view for each eye. This is important for accurate and realistic stereoscopic displays of the stored images to a user's left and right eyes.

Alternate embodiments can include capturing images at different offset angles, including, but not limited to: 180, 110, 72, 60, 45, 40, 36, and 30 degrees. In another embodiment, images could also be captured in the up and down directions either independent of or in combination with the left and right images.

Figure 3:
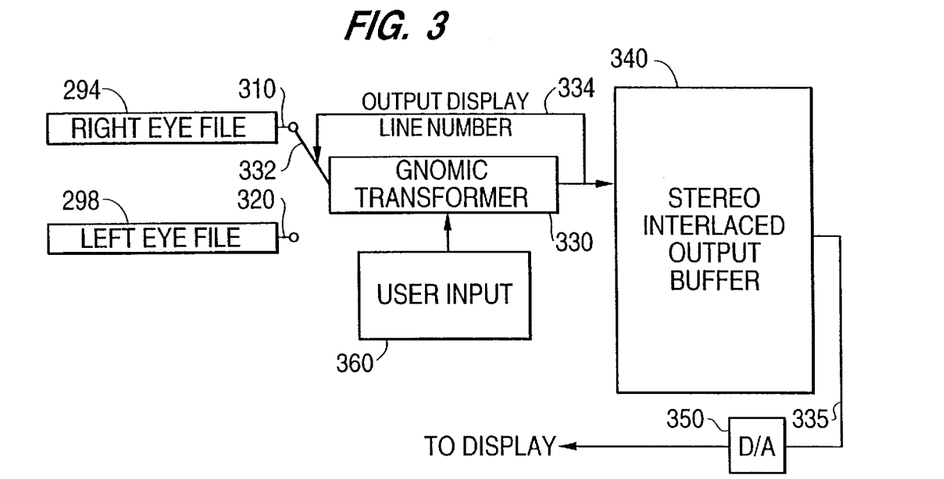
FIG. 3 illustrates a flowchart of the steps in the image file display process.
Figure 4:
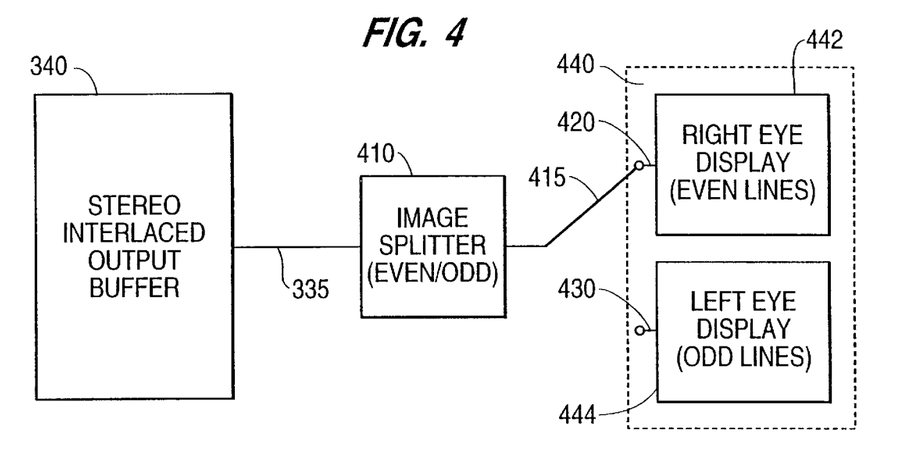
FIG. 4 illustrates an embodiment of a display in which the inventive method may be practiced and which is exemplary of other displays in which the inventive method may also be practiced.

FIG. 3 shows a flowchart of the steps performed in one embodiment of the stereoscopic image file display process. In FIG. 3, the right eye file 294 and left eye file 298 information are alternately output through right eye connection 310 and left eye connection 320 to input connection 332 for gnomic transformer 330. Gnomic transformer 330 produces an interlaced stereo image by interlacing the right eye file 294 information into the even numbered lines and the left eye file 298 information into the odd numbered lines of the interlaced stereo image. Interlacing of the image data is accomplished by feedback loop 334, which outputs the number of the next line in the image, and, if it is an even number, then input connection 332 switches to right eye connection 310 to receive the next line of image data. Similarly, if the output line number is an odd number, then input connection 332 switches to left eye connection 320 to receive the next line of image data. This interlaced stereo image is then sent to a stereo interlaced output buffer 340. In one embodiment, stereo interlaced output buffer 340 outputs the stereo image as an interlaced display signal 335 to a Digital-to-Analog (D/A) converter 350 which converts interlaced display signal 335 to an analog signal and then transmits the analog signal to a display. FIG. 4 shows one embodiment of a stereo display apparatus in which the inventive method may be practiced and which is exemplary of other displays in which the inventive method may also be practiced. In FIG. 4, the interlaced display signal 335 is output from stereo interlaced output buffer 340 to an image splitter 410. Image splitter 410 splits out the even and odd lines from the interlaced display signal 335 and sends the even lines via output connection 415 to a right eye display connection 420 to a right eye display 442 and sends the odd lines via output connection 415 to a left eye display connection 430 to the left eye display 444 of a miniature head mounted display 440. Output connection 415 switches between right eye display connection 420 and left eye display connection 430 based on the line number of the next line to be output. For example, if the next line to be output is an even number then output connection 415 switches to the right eye display connection 420, and if the next line to be output is an odd number then output connection 415 switches to the left eye display connection 430. Alternative stereo displays include, but are not limited to, the following: dual displays; independent miniature displays head mounted for each eye; displays with polarized filters that direct independent monitor images to each eye; color filters that direct stereo images to each eye through color mapping; and sequential shuttered glasses that alternately display every image to alternating eyes allowing the left eye to receive the left eye image and then the right eye to receive the right eye image, in rapid succession.

Figures 5A, 5B:
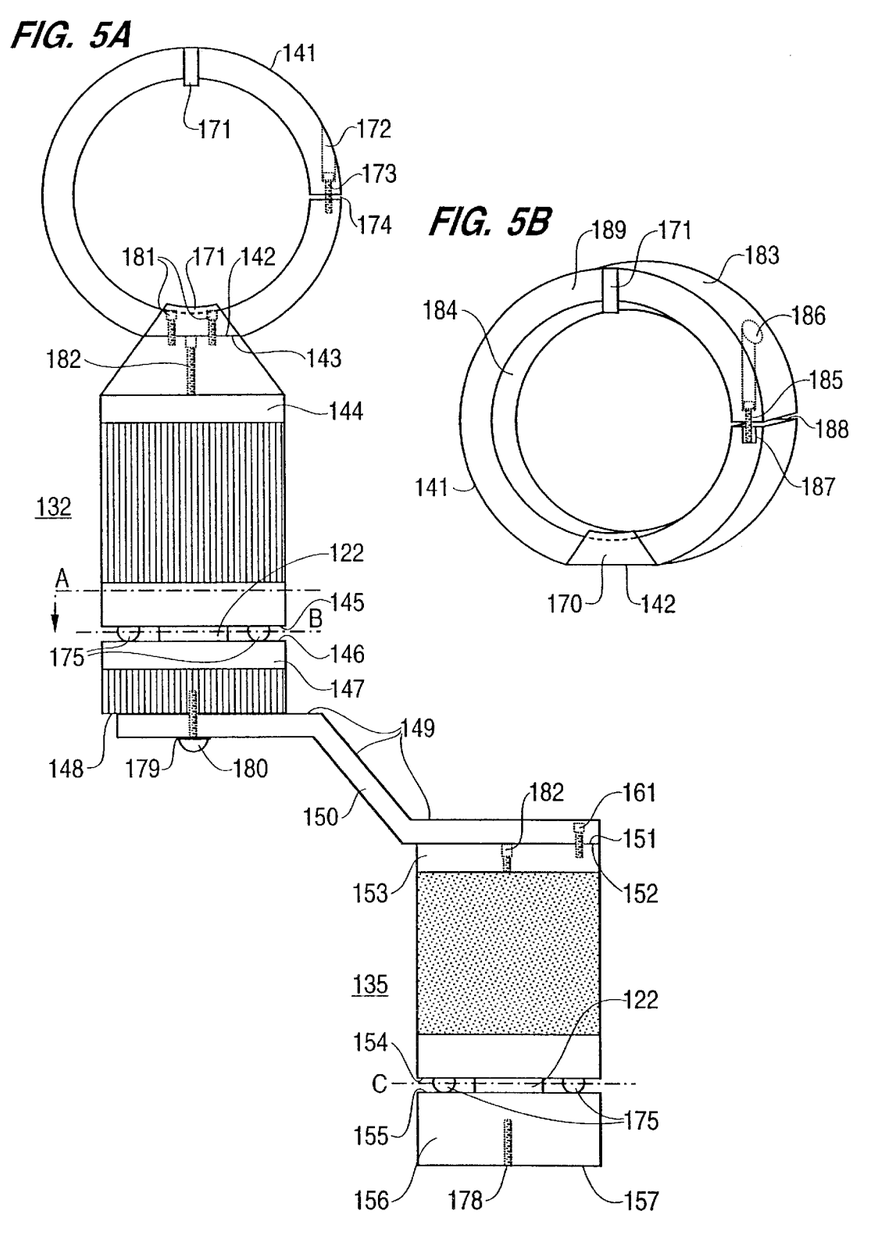
FIG. 5A illustrates one embodiment of the offset mounting system.
FIG. 5B illustrates a side-perspective view of the lens mount.

FIG. 5A shows one embodiment of offset mounting means 120. In FIG. 5A, offset mounting means 120 consists of a lens mount 141 with a lens mount bottom 142 that securely attaches to the top end 143 of the top-half 144 of a two-stop rotator 132. The bottom end 145 of the top-half 144 of the two-stop rotator 132 is rotably connected to the top end 146 of the bottom-half 147 of the two-stop rotator 132 and the bottom end 148 of the bottom-half 147 of the two-stop rotator 132 securely attaches to a top side 149 at a first end of an eccentric mount 150. Bottom side 151, at a second end of the eccentric mount 150, securely attaches to a top end 152 of a top-half 153 of an n-stop rotator 135, a bottom end 154 of the top-half 153 of the n-stop rotator 135 is rotably connected to a top end 155 of a bottom-half 156 of the n-stop rotator 135. Bottom end 157 of bottom-half 156 of n-stop rotator 135 contains a support means mounting recess 178 for attaching the offset mounting means 120 to the support means 190. The surface of both top-half 144 and bottom-half 147 can have a grooved areas to provide easier grasping by a user when rotating the two-stop rotator 132. Likewise, the grooved areas could be knurled, bumped, or some other grip enhancing structure in other embodiments.

FIG. 5B provides a side-perspective view of lens mount 141. In FIG. 5B, lens mount 141 comprises an outer surface 183, an inner surface 184, an image side 189, and a back side (not shown). Lens mount 141 is a substantially complete annular ring having an opening 188 that extends the across the width of image side 189 and extending between inner and outer surfaces 184 and 183, respectively, to create upper and lower portions of lens mount 141. Fastening screw 185 is recessed downward through recessing slot 186 on outer surface 183 in the upper portion of lens mount 141, passing through opening 188, and into the lower portion of lens mount 141 having a screw recess 187 for receiving the fastening screw 185. In the present embodiment opening 188 is disposed at an approximately 90 degree angle from lens mount bottom 142. Lens mount bottom 142 is a flat section on the lower portion of outer surface 183. Fastening screw 185 is loosened to permit installation of lens 114 (not shown) and tightened to close opening 188 to securely hold lens 114. Alternate embodiments of the lens mount are disclosed in co-pending U.S. application Ser. No. 08/767,376 which is incorporated by reference herein in its entirety.

Embodiments of the present invention contemplate the two-stop and n-stop rotators 132 and 135, respectively, including a low friction layer between the contacting surfaces of top-half 144 of two-stop rotator 132 and bottom-half 147 of two-stop rotator 132 and between top-half 153 of n-stop rotator 135 and bottom-half 156 of n-stop rotator 135. This low friction layer preferably includes at least one Teflon™ (or equivalent) disk. Alternative embodiments of the two-stop and n-stop rotators 132 and 135, respectively, include bearings, a fluid filled enclosure, and coated surfaces. In one embodiment, the lens mount 141, two-stop rotator 132, eccentric mount 150, n-stop rotator 135, and support means 190 are made of aluminum and/or anodized aluminum.

Figure 5C:
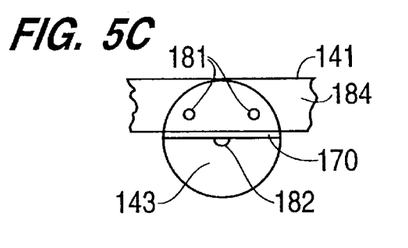
FIG. 5C illustrates a cut-away top view of the connection between the lens mount and the two-stop rotator.

FIG. 5C show a cut-away top view of the connection of lens mount 141 and top end 143 of top-half 144 of two-stop rotator 132. Lens mount 141 has a pair of screws 181 recessed through inner surface 184, extending through lens mount bottom 142 and into top end 143 of top-half 144 of 2 stop-rotator 132 to securely fasten lens mount 141 to top end 143. Bottom lip 170 is attached to image side 189 of lens mount 141 with the bottom edge of bottom lip 170 being aligned with and extending along lens mount bottom 142. Bottom lip 170 extends from the lens mount bottom 142 along image side 189 with the top edge of bottom lip 170 extending a short distance past inner surface 184. The top edge of bottom lip 170 is curved in substantially the same arc as inner surface 184. Bottom lip 170 is centered over top end 143 and recessed screw 182. Top lip 171 is similarly attached to image side 189 of lens mount 141 with top edge of top lip 171 being substantially aligned with outer surface 183 at a point essentially 180 degrees from bottom lip 170. Top lip 171 extends downward from outer surface 183 along image side 189 with the bottom edge of top lip 171 extending a short distance past inner surface 184. Alternate embodiments for lips include, but are not limited to: a single continuous lip and more than two lips equally arranged around image side 189.

Referring again to FIG. 5A, recessed screw 182 extends from top end 143 of top-half 144 of two-stop rotator 132 downward through bottom end 145 of top-half 144 and into two-stop rotator central bore 122 where it terminates and operates to rotably connect top-half 144 and bottom-half 147 of two-stop rotator 132. FIG. 5A also shows screw 180 passing through washer 179 and bottom side 152 at a first end of eccentric mount 150 and into bottom end 148 of bottom-half 147 of two-stop rotator 132 to securely fasten two-stop rotator 132 to eccentric mount 150.

Figure 5D:
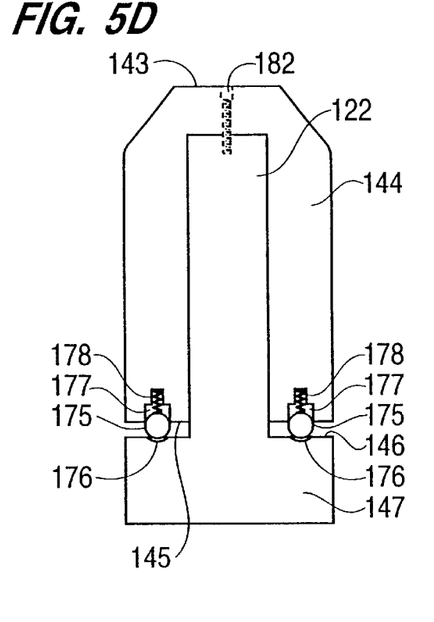
FIG. 5D illustrates a partial cross-section of the two-stop rotator that shows the structure of the positioning elements and central bore.
Figure 5E:
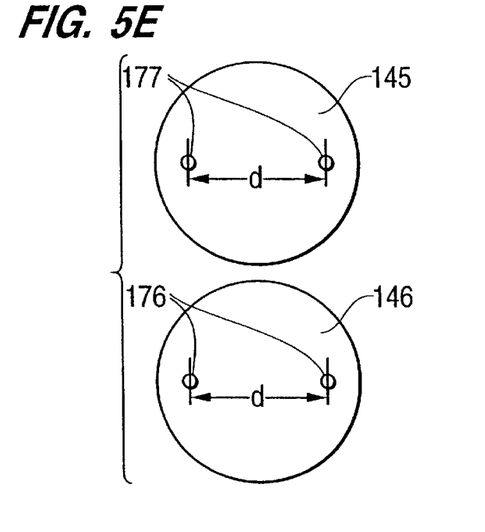
FIG. 5E illustrates a bottom view of the top-half and top view of the bottom-half of the two-stop rotator.

FIG. 5D is a partial cross-section of two-stop rotator 132 along line A and shows the internal structure of the two-stop rotator 132 positioning elements. In the present embodiment, bottom end 145 of top-half 144 contains two recesses 177 positioned 180 degrees apart along the center line of bottom end 145. Springs 178 are positioned in recesses 177, ball bearings 175 are positioned on top of the springs 178, and bottom-half 147 is fastened to top-half 144 so that top end 146 of bottom-half 147 contact ball bearings 175 and strain springs 178 into recesses 177. The strain on springs 178 creates a force that constantly pushes ball bearings 175 against top end 146 of bottom-half 147. In the present embodiment, top-half 144 is fastened to bottom-half 147 by inserting fastening screw 182 through top end 143 of top-half 144 and into central bore 122 that extends from bottom-half 147. Referring now to FIG. 5E, as ball bearings 175 slide into curved indents 176 on top end 146 of bottom-half 147 the force exerted by the strained springs holds the ball bearings 175, and, thus, two-stop rotator 132 in place. Significant force must be exerted to move the ball bearings 175 out of the curved indents 176 in order to rotate the twostop rotator 132. The on-center distance d between recesses 177 is equal to the on-center distance between curved indents 176. In addition, recesses 177 and curved indents 176 are aligned along the center line of two-stop rotator 132. In an alternate embodiment with an odd number of recesses and curved indents, the recesses and curved indents would have equidistant radii from the center point of the two-stop rotator 132 and be at equal offset angles, for example, radii equal to 0.5 inches and the offset angles equal to 110 degrees for a 3-stop rotator.

Figure 5F:
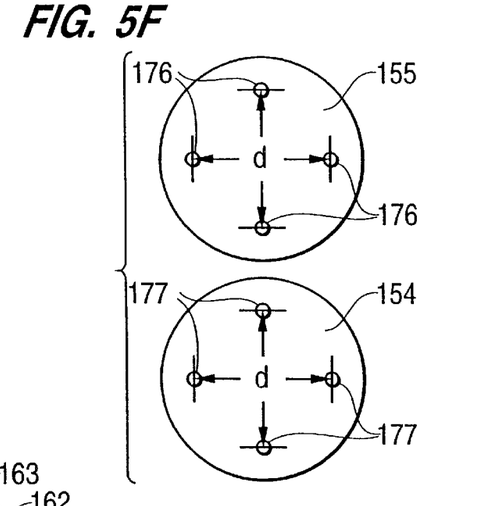
FIG. 5F illustrates a bottom view of the top-half and top view of the bottom-half of the n-stop rotator.

FIG. 5F shows the four recesses 177 and curved indents 176 of the current embodiment of the n-stop rotator 135. The operation is consistent with that described above for two-stop rotator 132 and alternate embodiments with odd numbers of recesses and curved indents.

Figure 5G:
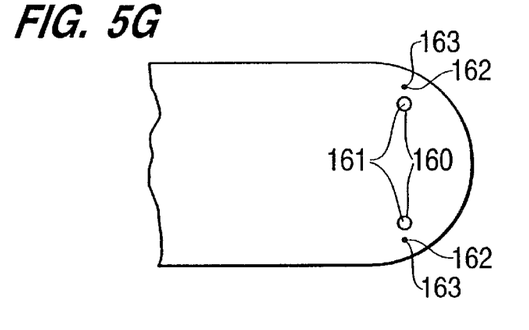
FIG. 5G illustrates a partial cut-away view of the top side of eccentric mount at the n-stop rotator end.

FIG. 5G shows a partial cut-away view of top side 149 at a second end of eccentric mount 150. Screws 161 are recessed into and through eccentric mount 150 through recessed screw holes 160 and into top end 152 of top-half 153 of n-stop rotator 135. Recessed screw holes 160 are parallel to and offset from the center line of n-stop rotator 135. Eccentric mount 150 also has locator pin holes 162 to receive locator pins 163. Locator pins 163 extend through eccentric mount 150 and into top end 152 of top-half 153 of n-stop rotator 135.

Figure 6:
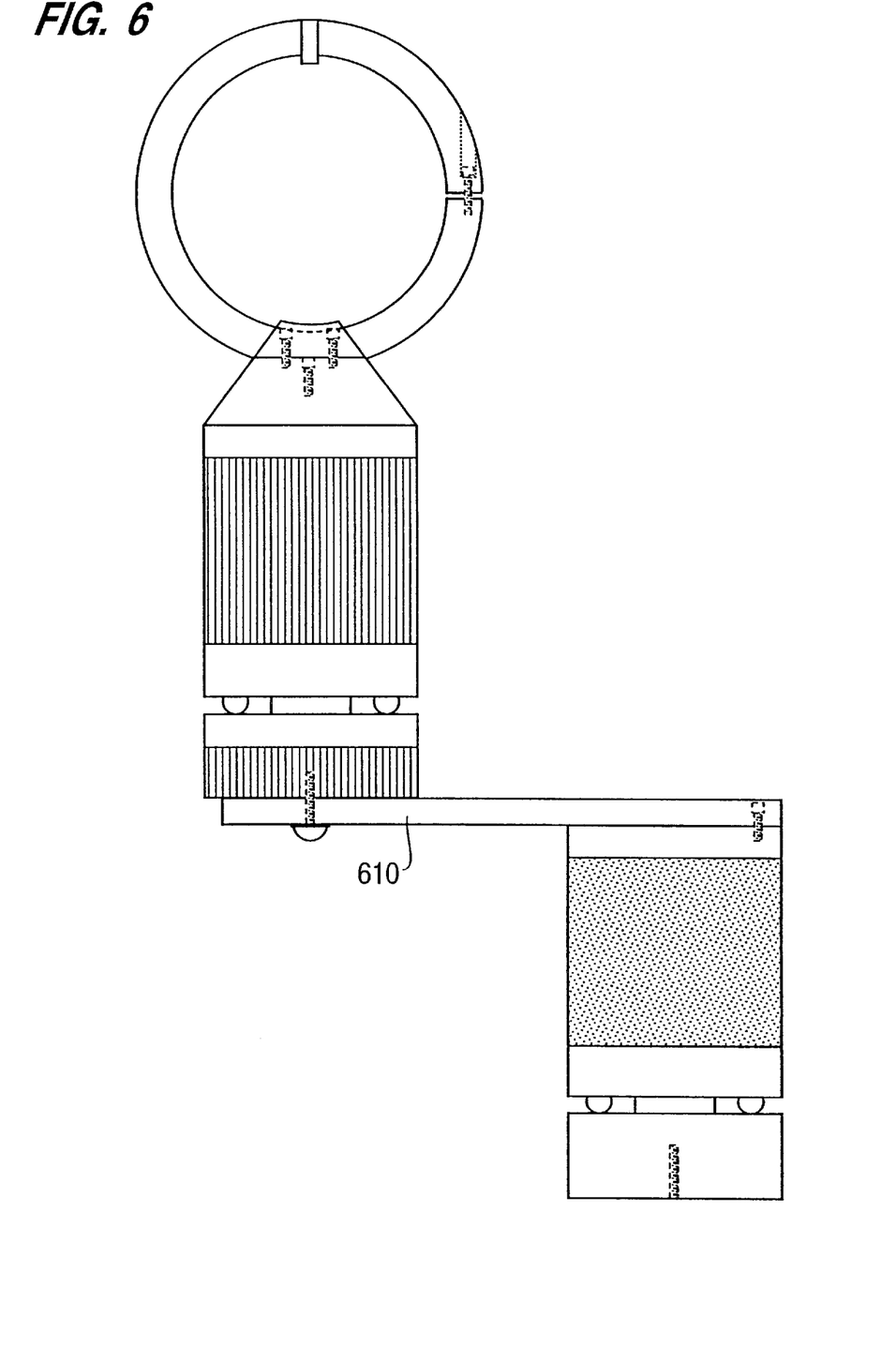
FIG. 6 illustrates an alternative embodiment of the offset mounting system.

FIG. 6 shows an alternate embodiment of the offset camera platform means 500. In this embodiment, the angled eccentric mount 150 of FIG. 5 is replaced with a straight eccentric mount 610. All other elements are identical to those described above for FIG. 5A. Another alternate embodiment would replace the angled eccentric mount 150 of FIG. 5A with a centered straight mount so that equal lengths of the straight mount extend past the n-stop rotator 135. In addition, the straight mount would permit the two-stop rotator 132 to slide from side-to-side.

What has been described is merely illustrative of the application of the principles of the present invention. Other arrangements and methods can be implemented by those skilled in the art without departing from the spirit and scope of the present invention.

All U.S. Patent Applications referenced herein shall be deemed to be incorporated by reference as to their entire contents.

What is claimed is:

1. A method of capturing immersive images for stereoscopic display comprising the steps of:

mounting an offset mounting means to a support means at a first rotatable end of said offset mounting means;

mounting an image capture means to a second rotatable end of said offset mounting means at a first lens position, said image capture means being rotatable about a lens thereof;

rotating said offset mounting means about said first rotatable end through a first series of positions to encompass 360 degrees;

capturing an image with said image capture means at each of said first series of positions such that said images cover a 360 degree field of view;

converting each of said captured images for each of said first series of positions into a first digital data image;

creating a first 360 degree representation for the first series of positions;

storing said first 360 degree representation in memory;

rotating said image capture means about said second rotatable end of said offset mounting means to a second lens position that is 180 degrees from the first lens position;

rotating said offset mounting means about said first rotatable end through a second series of positions to encompass 360 degrees;

capturing an image with said image capture means at each of said second series of positions such that said images cover a 360 degree field of view;

converting each of said captured images for each of said second series of positions into a digital data image; and creating a second 360 degree representation in memory for the second series of positions; and storing said second 360 degree representation in the memory.

2. The method of capturing immersive images for stereoscopic display according to claim 1, wherein said image capture means comprises video or still image camera systems.

3. The method of capturing immersive images for stereoscopic display according to claim 2, wherein said video or still image camera systems comprise digital and film cameras.

4. The method of capturing immersive images for stereoscopic display according to claim 1, wherein said image capture means comprises:

a camera; and a fisheye or wide-angle lens attached to said camera.

5. The method of capturing immersive images for stereoscopic display according to claim 1, wherein said creating a first representation step comprises the sub-step of:

combining said first digital data image for each of said first series of positions into said first 360 degree representation, so that said first 360 degree representation is a seamless image.

6. The method of capturing immersive images for stereoscopic display according to claim 5, further comprising the step of transforming a portion of said first and second 360 degree representations into perspectively correct images based on user input.

7. The method of capturing immersive images for stereoscopic display according to claim 6, wherein said user input comprises pan, tilt, and zoom instructions.

8. The method of claim 1, further comprising the steps of, after said rotating said image capture means about said second rotatable end of said offset mounting means to a second lens position that is 180 degrees from the first lens position, rotating said offset mounting means about said lens of said image capture means so that said image capture means is in a second position that is 180 degrees apart from said first position.

9. A camera mounting apparatus for capturing 360 degree immersive stereoscopic images, comprising:

an n-stop rotator means having a top end and a bottom end;

an eccentric mount means having d top side, a bottom side, a first end, and a second end, wherein said bottom side of said first end of said eccentric mount means is attached to said top end of said n-stop rotation means; and a two-stop rotator means having atop end and a bottom end. wherein said bottom end of said two-stop rotator means is attached to said top side of said second end of said eccentric mount means, said top end of said two-stop rotator means comprising:

a camera and lens mount means for receiving a camera and lens, said lens being rotatable from a first-stop position to a second-stop position 180 degrees from said first position.

10. The apparatus recited in claim 9, wherein said n-stop rotator means comprises:

a top-half, a bottom-half, said bottom-half being rotatably connected to said top-half; and a rotator means disposed between said top-half and said bottom-half for rotating said top-half around said bottom-half.

11. The apparatus recited in claim 10, wherein said rotator means comprises:

a pair of springs;

a pair of ball bearings;

said top-half having a bottom end with a pair of recesses to first receive said pair of springs and then receive said pair of ball bearings;

said bottom-half having a top end a pair of indents, said indents sized so as to allow said ball bearings to rest within said indents; and wherein said pair of indents and said pair of recesses will be coincident in two, 180 degree apart, positions of said rotably connected bottom-half and top-half of said two-stop rotator.

12. The apparatus recited in claim 9, wherein said n-stop rotator is offset on said offset camera platform mount from said two-stop rotator by an offset distance representative of half the standard inter-pupillary distance in human eyes.

13. The apparatus recited in claim 12, wherein said offset distanced is approximately one and one half inches from the center of said n-stop rotator to the center of said two-stop rotator.

14. A method of capturing immersive images for stereoscopic display comprising the steps of:
mounting an image capture means on an offset mounting means at a first mounting position;
rotating said offset mounting means though a series of positions about a support means to encompass 360 degrees;
capturing an image with said image capture means at each of said series of positions;
converting said captured images at each of said series of positions into digital data images;
rotating said image capture means to a second mounting position that is 180 degrees from the first mounting position on said offset mounting means;
rotating said offset mounting means through another series of positions about said support means to encompass 360 degrees;
capturing an image with said image capture means at each of said another series of positions;
converting said captured images at each of said another series of positions into digital data images;
creating two 360 degree representations in memory;
transforming a portion of each of said two 360 degree representations to perspectively correct distortion; and
displaying said portions of said two 360 degree representations independently to each eye of a user.

15. A rotator apparatus for use with a camera support means and a camera and lens to capture a 360 degree immersive stereo image, the rotator apparatus comprising:
a first rotator having a first axis of rotation in line with said camera support means;
an offset camera mounting means having a second rotator having a second axis of rotation in line with said lens, said second axis of rotation being parallel to said first axis of rotation at a distance D1 therefrom corresponding to approximately half the interpupillary distance of a human face; and
said first rotator having n stop positions wherein n is greater than or equal to two and said second rotator having two stop positions wherein said two stop positions are 180 degrees apart.

16. The rotator apparatus of claim 15, wherein said camera support means comprises a tripod, n is equal to two, and said camera lens comprises a fisheye lens.

17. The rotator apparatus of claim 15, wherein said camera support means comprises a tripod, n is greater than 2, and said camera lens comprises a lens having a field of view less than 180 degrees.

18. A method of using the rotator apparatus of claim 15 to capture a 360 degree immersive stereo image, comprising the steps of:
mounting a camera and lens to said second rotator and a camera support means to said first rotator;
rotating the camera and offset camera mounting means in a first direction of rotation about the camera support means to encompass 360 degrees;
taking a picture with said camera at each of said n stops of said n stop rotator;
rotating the camera by the first rotator to a second stop position;
rotating the camera and offset camera mounting means in a direction of rotation about the camera support means to encompass 360 degrees; and
taking a picture with said camera at each of said n stops of said n stop rotator.

* * * * *